3,261,794
3-PERFLUOROALKYL-1,2,4-BENZOTHIADIAZINE-
1,1-DIOXIDE DERIVATIVES
Maxwell Gordon, Elkins Park, and Edward A. Nodiff,
Philadelphia, Pa., assignors to Smith Kline & French
Laboratories, Philadelphia, Pa., a corporation of
Pennsylvania
No Drawing. Filed May 1, 1959, Ser. No. 810,212
6 Claims. (Cl. 260—243)

This invention relates to a novel series of 3-perfluoro-alkyl-1,2,4-benzothiadiazine-1,1-dioxide derivatives having utility as diuretic agents. The compounds of this invention have been found to have an unexpectedly high level of diuretic and natriuretic activity with few side effects. In addition, these compounds are of use in lowering blood pressure.

More specifically, these compounds are represented by the following structural formula:

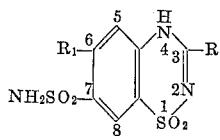

in which R represents a perfluoroalkyl group of from 1 to 4 carbon atoms, preferably trifluoromethyl, and $R_1$ represents chlorine, trifluoromethyl, nitro and amino. The compounds having a saturated link at the 2,3-position hereafter called the dihydro congeners are a particularly important aspect of this invention because of their high level of activity.

Advantageous and preferred compounds are those in which R is trifluoromethyl and $R_1$ is chloro together with its dihydro congener.

The nontoxic, pharmaceutically acceptable alkali metal salts of these compounds can be used alternatively, for example, the sodium or potassium salts. These are prepared by reacting the parent compounds with a hydroxide in a solvent in which the reactants are substantially soluble, then evaporating the solvent.

These compounds are prepared by reacting the known 5-substituted-2,4-disulfamylanilines with an excess of a perfluoroalkanoic acid and its anhydride, usually at elevated temperatures. If the anhydride has a sufficiently high boiling point it can be used alone. The resulting N-acyl intermediate is cyclized at elevated temperature, such as from about 200° C. to about 350° C. preferably from about 220–310° C. to form the desired 7-sulfamyl-3-perfluoroalkyl-1,2,4-benzothiadiazine-1,1-dioxide.

The 6-amino- and 2,3-dihydro compounds are preferably prepared by reducing the benzothiadiazines prepared as above, in the case of the dihydro compounds, using a mild bimetallic hydride reducing agent such as sodium borohydride at moderate temperatures such as from about 0° to 25° C. in a nonreactive solvent such as water or aqueous alcohol.

It will be apparent to one skilled in the art that variations in the structures of the compounds of this invention can be made without adversely affecting the advantageous activity of these compounds such as N-methylation of the sulfamyl moiety or at the 2 or 4 positions. Such active compounds are considered as equivalents of those described in detail hereafter.

Example 1

A mixture of 18.2 g. of 2,4-disulfamyl-5-chloroaniline in 200 ml. of trifluoroacetic acid and 134 g. of trifluoroacetic anhydride is stirred and heated at reflux overnight. The reaction mixture is evaporated. The residue is recrystallized from aqueous ethanol to give the N-acyl derivative, M.P. 285° C.

This compound (8.3 g.) is heated on an oil bath under nitrogen at 220° C. The temperature is raised to 300° C. in 15 minutes then maintained at 300–315° C. for thirty minutes. After cooling, the residue is extracted with boiling ethanol to give the desired 6-chloro-7-sulfamyl-3-trifluoromethyl-1,2,4-benzothiadiazine-1,1-dioxide, M.P. >360° C.

Example 2

A mixture of 5 g. of 6-chloro-7-sulfamyl-3-trifluoromethyl-1,2,4-benzothiadiazine-1,1-dioxide in 75 ml. of water at 0° C. is treated with a solution of 1.3 g. of sodium borohydride in 25 ml. of water keeping the temperature below 10° C. After 30 minutes at room temperature, the reduced product is filtered, washed with water and recrystallized from aqueous ethanol to give 6-chloro-7-sulfamyl-2,3-dihydro-3-trifluoromethyl-1,2,4-benzothiadiazine-1,1-dioxide.

Example 3

A mixture of 9.8 g. of 2,4-disulfamyl-5-trifluoromethyl-aniline in 250 ml. of trifluoroacetic acid and 140 g. of trifluoroacetic anhydride is heated at reflux with stirring for 10 hours. The mixture is evaporated and the resulting acyl derivative is heated at 275 to 330° C. for about 45 minutes as described in Example 1 to give 3,6-bistrifluoromethyl-7-sulfamyl-1,2,4-benzothiadiazine-1,1-dioxide.

Example 4

A slurry of 2.6 g. of the bistrifluoromethyl compound of Example 3 in 100 ml. of water with some methanol is treated at ice bath temperature with a solution of 0.75 g. of sodium borohydride in 15 ml. of water. The reaction mixture is then maintained at room temperature for 45 minutes. The quenched product is recrystallized from ethanol to give 3,6-bistrifluoromethyl-7-sulfamyl-2,3-dihydro-1,2,4-benzothiadiazine-1,1-dioxide.

Example 5

A slurry of 9.8 g. of 2,4-disulfamyl-5-chloroaniline and 18 g. of perfluorobutyric anhydride is heated overnight on the steam bath. The reaction mixture is evaporated in vacuo and the residue is recrystallized from ethanol. The resulting N-acyl compound, is heated at 275–335° C. for 30 minutes. The residue is then recrystallized from aqueous ethanol to give 6-chloro-7-sulfamyl-3-heptafluoropropyl-1,2,4-benzothiadiazine-1,1-dioxide.

Example 6

A mixture of 15.0 g. of 2,4-disulfamyl-5-nitroaniline in 200 ml. of trifluoroacetic acid and 125 g. of trifluoroacetic anhydride is heated at reflux for 14 hours. After working up as in Example 1 the N-acyl derivative is isolated. This is cyclized by heating as described in Example 1 to give 6-nitro-7-sulfamyl-3-trifluoromethyl-1,2,4-benzothiadiazine-1,1-dioxide.

Example 7

A solution of 5 g. of 6-nitro-7-sulfamyl-3-trifluoromethyl-1,2,4-benzothiadiazine-1,1-dioxide in 200 ml. of ethanol with 0.5 g. of 5% palladium-on-charcoal is hydrogenated at 60 p.s.i. at room temperature until four equivalents of hydrogen are absorbed. The catalyst is removed and product isolated by evaporating the alcohol to give 6-amino-7-sulfamyl-2,3-dihydro-3-trifluoromethyl-1,2,4-benzothiadiazine-1,1-dioxide.

Interrupting the hydrogenation using Raney nickel after just less than three equivalents of hydrogen are absorbed gives, by fractional recrystallization, 6-amino-7-sulfamyl-3-trifluoromethyl-1,2,4-benzothiadiazine-1,1-dioxide.

Example 8

A mixture of 2.5 g. of 2,4-disulfamyl-5-trifluoromethylaniline in 75 ml. of perfluoropropionic acid and 50 g. of perfluoropropionic anhydride is heated at reflux for 10 hours. Evaporation gives the crude N-acyl residue which is heated at 280–320° C. for 30 minutes as described in Example 1 to give 3-pentafluoroethyl-6-trifluoromethyl-7-sulfamyl-1,2,4-benzothiadiazine-1,1-dioxide.

What is claimed is:

1. 6 - chloro - 7-sulfamyl-3-trifluoromethyl-1,2,4-benzothiadiazine-1,1-dioxide.
2. 3,6 - bistrifluoromethyl - 7 - sulfamyl-1,2,4-benzothiadiazine-1,1-dioxide.
3. 6 - amino-7-sulfamyl-2,3-dihydro-3-trifluoromethyl-1-2,4-benzothiadiazine-1,1-dioxide.
4. A chemical compound having a fundamental structural formula selected from the group consisting of:

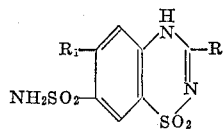

and

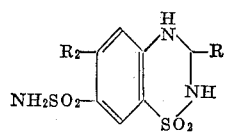

in which R is perfluoroalkyl having 1 to 4 carbon atoms inclusive; $R_1$ is a member selected from the group consisting of chloro, trifluoromethyl, nitro and amino; and $R_2$ is a member selected from the group consisting of nitro and amino.

5. 6 - nitro - 7-sulfamyl-3-trifluoromethyl-1,2,4-benzothiadiazine-1,1-dioxide.
6. 6 - amino - 7 - sulfamyl-3-trifluoromethyl-1,2,4-benzothiadiazine-1,1,-dioxide.

References Cited by the Examiner

UNITED STATES PATENTS 2,809,194  10/1957  Novello _____ 260—243
2,894,948  7/1959   De Stevens et al. ____ 260—243

OTHER REFERENCES

Goldberg et al.: Federation Proceedings, vol. 18, No. 1, Part 1 (March 1959), page 396.

Yale: Journal of Med. and Pharm. Chem., vol. 1, No. 2, pages 121–133.

De Stevens et al.: Experientia, vol. 14, page 463 (1958).

Herrmann et al.: Texas State Journ. of Med. (December 1958).

NICHOLAS S. RIZZO, *Primary Examiner.*

IRVING MARCUS, *Examiner.*

C. A. MUSERLIAN, *Assistant Examiner.*